E. R. WALKER.

Argand Gas-Burner.

No. 6,453.

Reissued May 25, 1875.

Inventor.

E. R. Walker.

Witnesses.

J. C. Wanger

Isaac A. Brownell.

Assignee. — E. P. Gleason.

THE GRAPHIC CO. PHOTO-LITH. 39 & 41 PARK PLACE, N.Y.

UNITED STATES PATENT OFFICE.

EDWIN R. WALKER, OF NEW YORK, N. Y., ASSIGNOR TO ELLIOTT P. GLEASON, OF SAME PLACE.

IMPROVEMENT IN ARGAND GAS-BURNERS.

Specification forming part of Letters Patent No. 72,244, dated December 17, 1867; reissue No. 6,453, dated May 25, 1875; application filed April 2, 1873.

*To all whom it may concern:*

Be it known that EDWIN R. WALKER, of the city, county, and State of New York, heretofore invented, made, and applied to use certain new and useful Improvements in Argand Gas-Burners, of which the following is a specification, referring to the accompanying drawing, making part of the same, in which—

Figure 1:
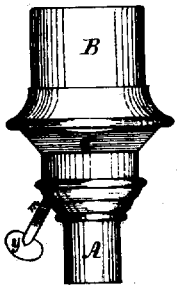
Figure 8:
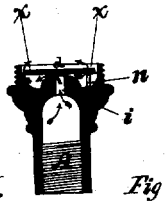
Figure 2:
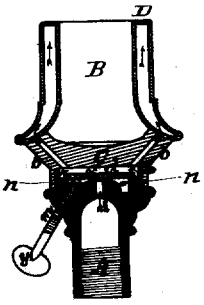
Figure 5:
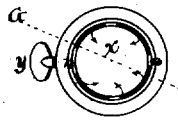
Figure 6:
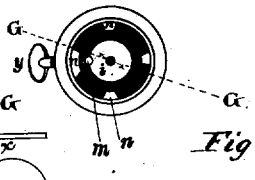
Figure 3:
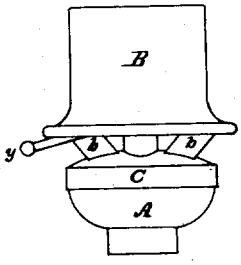
Figure 7:
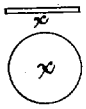
Figure 4:
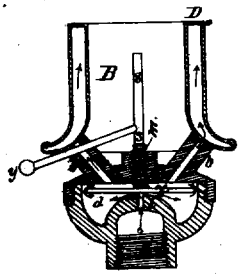

Figure 1 is a view of the improved argand-burner. Fig. 2 is a vertical section of the same. Fig. 3 is an elevation, and Fig. 4 is a vertical section, of a modification of the said improvement. Fig. 5 is a top view of the lower section A of the argand-burner shown in Figs. 1 and 2, with plate in place. Fig. 6 is a like view of the same with the plate *x* removed. Fig. 7 is the plate *x*, shown edgewise and flat. Fig. 8 is a vertical section of the lower section A of the argand-burner, on the line G G of Figs. 5 and 6.

Similar letters mark like parts in all the said figures.

The first part of said invention relates to certain means for stopping the noise of an argand-burner, which proceeds from the direct passage of the gas through the same; and consists in arranging a deflecting-plate with the gas-inlet, so that the gas, as it enters by the inlet, will strike against, and be deflected by, the plate, and, in consequence, be distributed with the effect to break the current and render its passage noiseless.

The second part of said invention relates to the means employed to control the gas-supply at the burner after the full head is turned on in the usual way; and this consists in arranging, with the gas-inlet and deflecting-plate, serving as a valve to the inlet, a screw or other mechanical device, in such a manner that the plate or valve may be raised or depressed, with reference to the inlet, at will from outside the burner, and the gas-supply, by that means, increased or diminished to the extent desired.

In the drawing, A is the lower or bottom section of the burner, and B the upper or top section of the same. The lower portion or section of the burner is provided with an inlet, *i*, for introducing the gas, and has cast in its interior, a slight distance above the inlet, a series of ribs or projections, *n*, to receive the disk or plate of metal *x*. The upper part B of the burner is connected with the arms *b* and collar *c*, the latter being hollow, and forming a chamber, D, communicating with the passages through the arms *b*. The collar screws upon a neck of the lower part A of the burner, and by that means the two parts are united. A regulating-screw, *m*, is inserted through the lower part of the burner, so that its point may be brought to bear against the under side of the plate *x*, and it has a thumb-piece or handle, *y*, by which it is easily turned. By turning up the screw *m* the plate *x* is raised from its seat on the ribs *n*, and from the inlet *i*, and an increased supply of gas is admitted to the burner; and by turning down the screw *m*, the plate is lowered or depressed onto its seat *n*, and to the inlet *i*, and the supply of gas is diminished and turned off.

The gas-supply enters the chamber *d* at the union of the two parts, through the inlet *i*. As it passes through the inlet it strikes against the under side of the metallic plate *x*, which deflects and distributes it at right angles, and, by so doing, breaks the current and destroys the hissing or singing noise that usually attends the passage of an unbroken current through the argand-burner. The gas thus distributed by the deflecting-plate *x* passes from the chamber *d*, through the arms *b*, into the burner B, and is inflamed in the usual way. The supply of gas is controlled by turning the regulating-screw *m*, as above described.

The deflecting-plate *x* is elevated a slight distance above the inlet *i* on the ribs or seat *n*; and there is an open space around the plate *x*, between the ribs *n* in the chamber *d*, as shown in Figs. 2, 5, and 8, by means of which, when the plate is depressed to its lowest point, and the gas-supply is, in consequence, diminished to the same extent, a minute supply will continue to flow from the inlet, (between it and the plate, and through the open space around the plate,) as shown by the arrows, and thence through the burner to the tip D. This minute supply is sufficient only to maintain combustion at the tip without affording light, but serves to produce light instantaneously by simply turning on the supply of gas by means of the regulating-screw *m*.

In Figs. 3 and 4 of the drawing the deflecting plate or valve *x* is attached to a spindle, *s*, having a screw-thread, *m*, cut upon it, and inserted in the center of the collar *c*, so that the plate or valve shall be directly over the inlet *i* in the lower part of the burner. To this spindle is attached a lever, *y*, by means of which the disk or valve *x*, connected, as shown, with the spindle *s*, may be elevated or depressed at will from outside the burner.

When the lever *y* is swung in one direction the valve is elevated and the gas-supply increased; and when the lever is swung in the opposite direction the valve is depressed with reference to the inlet, and the gas-supply is diminished.

Having described the invention of the said EDWIN R. WALKER, I do not claim as such the regulating-screw separately nor in combination, except as hereinaftar specified.

I claim as the invention of the said WALKER—

1. In an argand gas-burner, the combination of the plate or valve and the inlet, as and for the purpose described.

2. In an argand gas-burner, the combination of the screw, the plate, and the inlet, as and for the purpose described.

3. In an argand gas-burner, the combination and arrangement of the plate or valve with the inlet by means of ribs, projections, or devices, by which the inlet is left slightly open when the valve is shut, for a small supply of gas to pass, as and for the purpose described.

E. P. GLEASON,
*Assignee.*

Witnesses:
J. C. WAUGER,
ISAAC A. BROWNELL.